(12) United States Patent
Masaoka

(10) Patent No.: US 6,608,398 B2
(45) Date of Patent: Aug. 19, 2003

(54) VEHICLE MOUNTED ELECTRICAL COMPONENT

(75) Inventor: Hiroaki Masaoka, Nagoya (JP)

(73) Assignees: Autonetworks Technologies, Ltd., Nagoya; Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 165 days.

(21) Appl. No.: 09/771,578

(22) Filed: Jan. 30, 2001

(65) Prior Publication Data

US 2001/0024064 A1 Sep. 27, 2001

(30) Foreign Application Priority Data

Feb. 14, 2000 (JP) ........................................ 2000-035087

(51) Int. Cl.[7] ................................................. B60L 1/14
(52) U.S. Cl. ........................ 307/10.1; 307/10.8; 307/38
(58) Field of Search ............................... 307/10.1, 10.8, 307/29, 38

(56) References Cited

U.S. PATENT DOCUMENTS 5,154,617 A * 10/1992 Suman et al. .............. 307/10.1
6,184,591 B1 * 2/2001 Viton .......................... 307/38

* cited by examiner

Primary Examiner—Brian Sircus
Assistant Examiner—Roberto J. Rios
(74) Attorney, Agent, or Firm—Oliff & Berridge, PLC

(57) ABSTRACT

In a vehicle-mounted electrical component, potentially redundant resistances 4d, 4h, 4i and the corresponding voltage detecting circuit 5d, or the terminals 21, 22, 23, 24 and the switch for turning the switch interposed between the terminals 21 and 22, and the terminals 23 and 24 ON and OFF are exposed on the external surface of the main body so that setting according to the specifications can be performed outside the main body.

4 Claims, 12 Drawing Sheets

VEHICLE MOUNTED ELECTRICAL COMPONENT

BACKGROUND OF THE INVENTION

1. Field of the Invention

The present invention relates to a vehicle-mounted electrical component connected between a prescribed power source and a plurality of loads for detecting a break in each load by detecting voltage drop at each individual resistance connected between each load and the power source by each voltage detector.

2. Description of the Related Art

In a combination vehicle-mounted electronic unit/rear junction block (rear J/B) for detecting a break in the high-mount stop lamp, the stop lamp, and the tail lamp of the vehicle, a break in the lamp has been detected, as shown in FIG. 15 (related example 1), by connecting detector resistances 4a–4i to the lamps 1a, 2a–2d, 3a–3d respectively in series in the rear junction block JB1 (rear J/B A), and then connecting voltage detectors 5a–5i to the detector resistances 4a–4i respectively in parallel with respect to each other so that voltage drop, if any, at any of the detector resistance 4a–4i is detected by the corresponding voltage detector when the lamps 1a, 2a–2d, 3a–3d are energized. Each voltage detector 5a–5i is constructed in such a manner that the electric potential difference generated across the detector resistance 4a–4i is supplied as voltage when the detector resistance 4a–4i is energized, and a prescribed signal is determined by the external determination apparatus, not shown, with said voltage as a power source. More specifically, a low voltage output is produced by the use of the voltage drop at each detector resistance 4a–4i while each detector resistance 4a–4i is being energized, and a high voltage output is produced by maintaining the voltage level of the power source 10 when each detector resistance 4a–4i is not energized.

In the electronic unit described above, in many cases, the numbers of high-mount stop lamps 1a, of stop lamps 2a–2d and of tail lamps 3a–3d installed are different depending on the grade or type of the automotive vehicle. For example, in the related example 1 shown in FIG. 15, a high-mount stop lamp 1a with power consumption of 18 watts, four stop lamps 2a–2d with power consumption of 21 watts, and four tail lamps 3a–3d with power consumption of 5 watts are provided, and in the related example 2 shown in FIG. 16, a rear junction block JB2 (rear J/B B) comprises two high-mount stop lamps 1a, 1b, two stop lamps 2a, 2b, and two tail lamps 3a, 3b. There is also another example having two stop lamps, two high-mount stop lamps, and four tail lamps though it is not shown in the figure. The numbers of the lamps 1a, 1b, 2a–2d, 3a–3d in the first, second, and another examples of the related art are shown in Table 1 below.

TABLE 1

| Detected Lamp | Example 1 | Example 2 | Another example |
|---|---|---|---|
| Stop lamp | 21W 4 lamps | 21W 2 lamps | 21W 2 lamps |
| High-mount stop lamp | 18W 1 lamp | 18W 2 lamps | 18W 2 lamps |
| Tail lamp | 5W 4 lamps | 5W 2 lamps | 5W 4 lamps |
| Detecting J/B | rear J/B A | rear J/B B | rear J/B C |

Reference numerals 6 and 7 in FIGS. 15 and 16 designate ON-OFF switches, and reference numerals 8 and 9 designate fuses respectively.

In the rear junction block JB1 of the related example 1 shown in FIG. 15, the first resistance 4a and the first voltage detector 5a are assigned to a single high-mount stop lamp 1a, the second resistance 4b and the second voltage detector 5b are assigned to the first stop lamp 2a, the third resistance 4c and the third voltage detector 5c are assigned to the second stop lamp 2b, the fourth resistance 4d and the fourth voltage detector 5d are assigned to the third stop lamp 2c, the fifth resistance 4e and the fifth voltage detector 5e are assigned to the fourth stop lamp 2d, the sixth resistance 4f and the sixth voltage detector 5f are assigned to the first tail lamp 3a, the seventh resistance 4g and the seventh voltage detector 5g are assigned to the second tail lamp 3b, the eighth resistance 4h and the eighth voltage detector 5h are assigned to the third tail lamp 3c, and the ninth resistance 4i and the ninth voltage detector 5i are assigned to the fourth tail lamp 3d and connected respectively.

When the junction block JB 2 having the same structure as the rear junction block JB1 of the related example 1 shown in FIG. 15 is applied to the automotive vehicle of the related example 2 shown in FIG. 16, the resistances 4d, 4e and the voltage detectors 5d, 5e for the two stop lamps 2c, and the resistances 4h, 4i and the voltage detectors 5h, 5i for the second tail lamps 3c, 3d for two tail lamps 3c, 3d of the related example 1 are redundant in the related example 2, when assignments of the related example 1 are maintained since the number of the lamps installed in the related example 1 and the number of the lamps installed in the related example 2 are different as shown in Table 1. In addition, the resistance and the voltage detector for the second high-mount stop lamp 1b in the related example 2 are not provided in the rear junction block JB1 of the related example 1, thereby resulting in shortage of circuit components.

In this case, since the load for the stop lamps 2a–2d with the power consumption of 21 watts and that for the high-mount stop lamp 1a, 1b with the power consumption of 18 W are generally equal, the identical components are used for each voltage detector 4a–4e in the real junction block JB1. Therefore, in the related example 2 shown in FIG. 16, one of the resistances 4d, 4e and the voltage detectors 5d, 53 for the redundant lamps (the resistance 4d and the voltage detecting circuit 5d) may be used for the second high-mount stop lamp 1b to supplement the shortage of the resistance and the voltage detector for the second high-mount stop lamp 1b.

However, in the related example 2 of FIG. 16, the resistances 4e, 4h, 4i and the voltage detectors 5e, 5h, 5i are still redundant. In such a case, when no lamp is connected to these resistances 4e, 4h, 4i and the voltage detectors 5e, 5h, 5i as a load, each voltage detector 5e, 5h, 5i outputs high voltage since the resistances 4e, 4h, 4i are not energized and thus no voltage drop has occurred. As a result, each voltage detector 5e, 5h, 5i makes a false detection that the lamp is broken, and may make a false alarm by a prescribed alarm apparatus (not shown).

Therefore, it is desired that the redundant resistances 4e, 4h, 4i and the voltage detectors 5e, 5h, 5i be connected to a prescribed external circuit so as not to be detected as a break. However, the method of providing such an external circuit to cause a short-circuit on the ground may results in deterioration of the detector resistances 4e, 4h, 4i because of excessive current flows therethrough. In addition, even when they are short-circuited on the side of the power source, the voltage detector 5e, 5h, 5i may detect a break in error. Therefore, a countermeasure against a false detection by the use of the external circuit is very difficult and ineffective because it is required to flow a current corresponding to the load of each respective lamp 2a–2d, 3a–3d. Therefore, other specific rear junction blocks (rear J/B, B and rear J/B C) in which the redundant resistances and the voltage detectors are eliminated must be provided according to the number of the lamp installed.

Under such a circumstance, the product number increases, and thus much effort is required for establishing new product numbers, and control of the product numbers in the process of manufacturing the rear junction block becomes complicated. In addition, support for establishment of the new product number for the limited-edition car results in increase in the number of manufacturing processes and much difficulty in maintenance.

SUMMARY OF THE INVENTION

Accordingly, it is an object of the present invention to provide a general-purpose vehicle-mounted electrical component adaptable for any cars irrespective of the grade or differences of models and types.

In order to achieve the above object, according to a first aspect of the invention, there is provided a vehicle-mounted electrical component to be connected between a prescribed power source and a plurality of loads, comprising a main body of the vehicle-mounted electrical component, a plurality of resistances positioned within said body and connected between said each individual load and said power source, a voltage detector positioned in said body for detecting a break in said each load by detecting voltage drop at each resistance individually, a potentially redundant resistance connecting terminal to be connected to at least said detector resistance and said voltage detector that can be redundant depending on the number of said load installed thereto out of said detector resistances and said voltage detectors, and an intermediate connecting terminal connected to the power source connecting terminal to be connected to said power source, and each assigned to said each individual potentially redundant resistance connecting terminal, wherein said potentially redundant resistance connecting terminal and said intermediate connecting terminal are formed in parallel with respect to each other exposed on the external surface of the main body of said vehicle-mounted electrical component so that they can be short-circuited with respect to each other by the prescribed external connecting member.

For example, said connecting member used is an electrically conductive short-circuit member detachably connectable to said potential redundancy resistance connecting terminal and to said intermediate connecting terminal on the external surface of said main body, according to the second aspect of the invention.

Alternatively, said connecting member used is a fuse detachably connectable to said potential redundancy resistance connecting terminal and said intermediate connecting terminal on the external surface of said main body, according to the third aspect of the invention.

Alternatively, said connecting member used is a switch for switching between ON and OFF mounted between said potentially redundant resistance connecting terminal and said intermediate connecting terminal, according to the fourth aspect of the invention.

DETAILED DESCRIPTION OF THE PREFERRED EMBODIMENTS

Now, a description will be given in more detail of preferred embodiments of the invention with reference to the accompanying drawings.

(First Embodiment)
<Structure>

Figure 1:
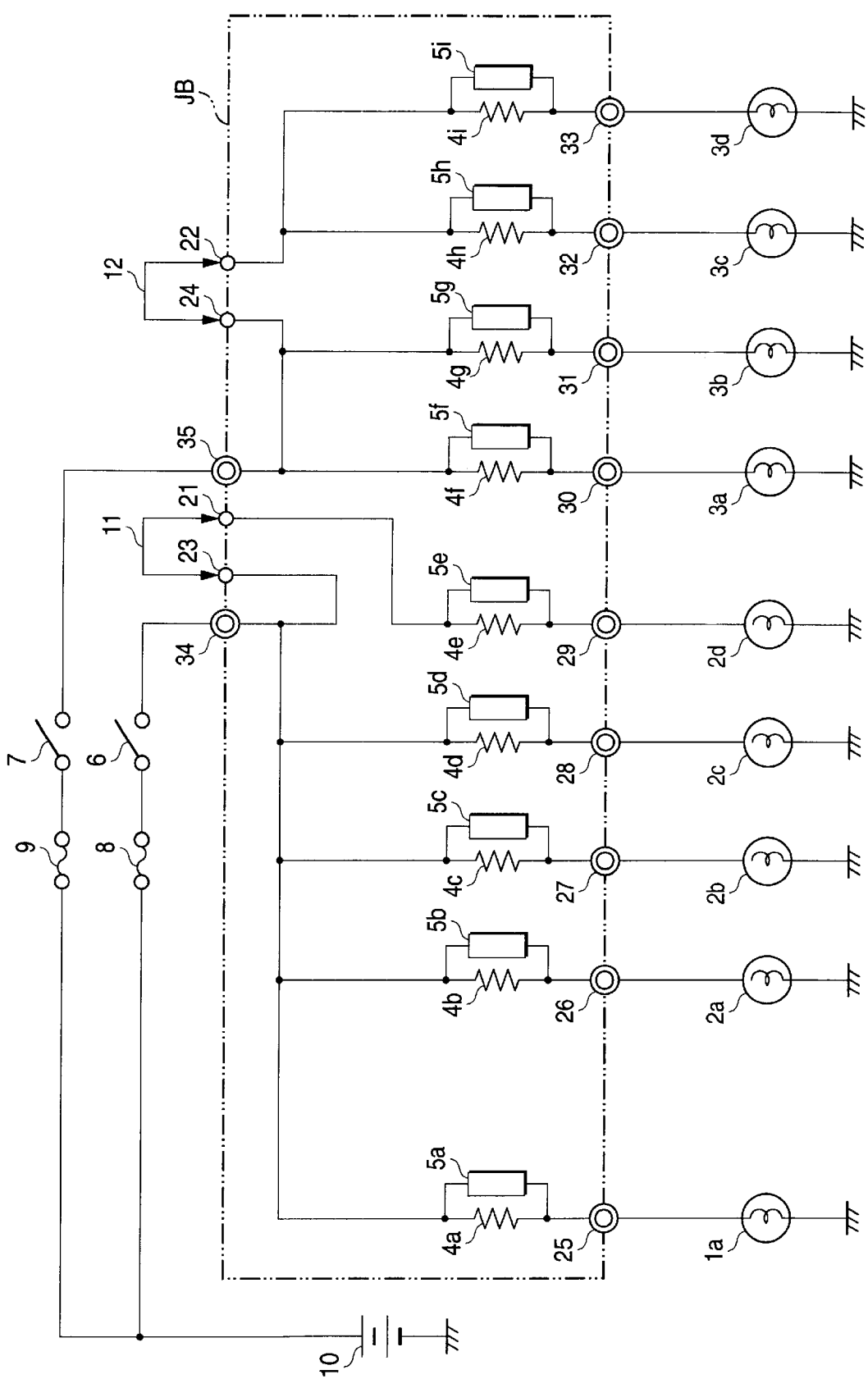
FIG. 1 is a block diagram of the vehicle-mounted electrical component according to the first embodiment of the invention showing a state of being applied to the car in accordance with the first specifications.
Figure 2:
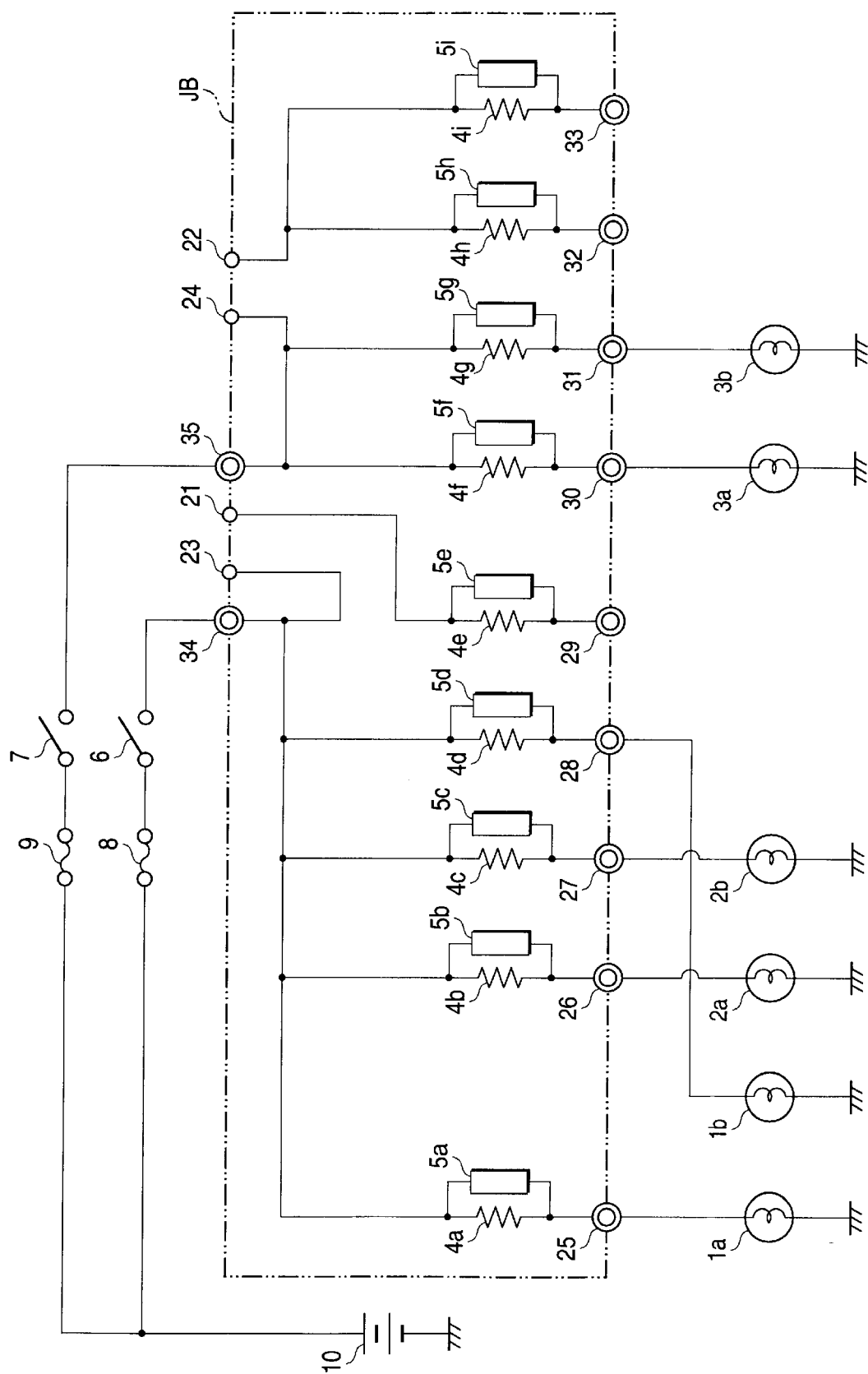
FIG. 2 is a block diagram of the vehicle-mounted electrical component according to the first embodiment of the invention showing a state of being applied to the car in accordance with the second specifications.
Figure 3:
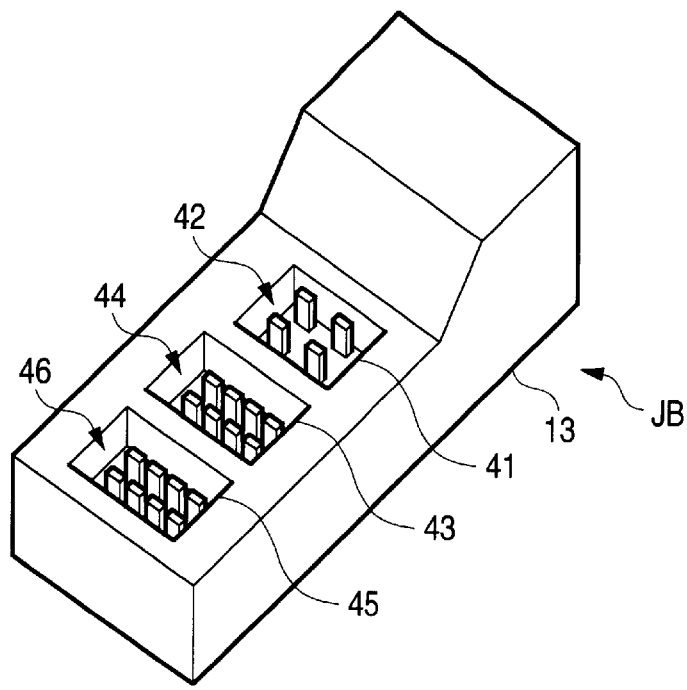
FIG. 3 is a perspective view of the vehicle-mounted electrical component according to the first embodiment of the invention.
Figure 4:
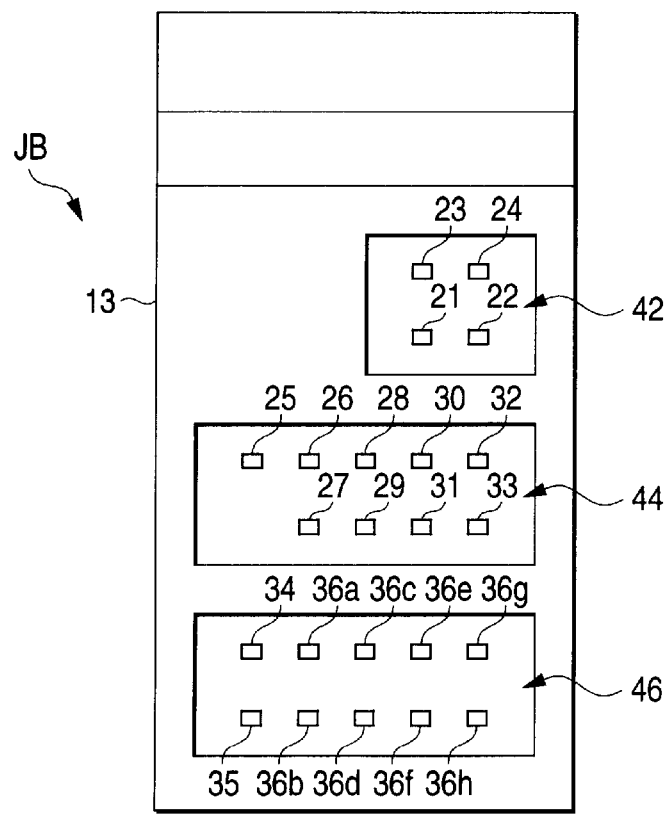
FIG. 4 is a plan view of the vehicle-mounted electrical component according to the first embodiment of the invention.

FIG. 1 is a block diagram showing a circuit in the first state in which the junction block JB as a vehicle-mounted electrical component according to the first embodiment of the present invention is connected to a plurality of loads 1a, 2a–2d, 3a–3d such as a vehicle-mounted lamp or the like, FIG. 2 is a block diagram showing a circuit in the second state in which said junction block JB is connected to a plurality of load 1a, 1b, 2a, 2b, 3a, and 3b, FIG. 3 is a perspective view of the junction block JB, and FIG. 4 is a plan view of the same. Identical numerals and signs designate the components having the same functions as related examples. Especially as regards the arrangement of the loads 1a, 1b, 2a–2d, and 3a–3d, FIG. 1 corresponds to the related example 1, and FIG. 2 corresponds to the related example 2.

As shown in FIGS. 1 and 2, the junction block JB as a vehicle-mounted electrical component detects a break in the lamp, if any, by detecting voltage drop at any of the detector resistances 4a–4i connected to the loads 1a, (1b), 2a–2d, 3a–3d respectively in series when a plurality of loads 1a, (1b), 2a–2d, 3a–3d are energized. Especially, as shown in FIG. 2, short-circuit members 11, 12 (FIG. 5 and FIG. 6) formed of a electrically conductive material such as metal can be detachably mounted for connecting and disconnecting the detector resistances that can be redundant depending on the arrangement of the loads 1a, 1b, 2a, 2b, 3a, and 3b of the vehicle (hereinafter referred to as "potentially redundant resistance") and the corresponding voltage detectors 5e, 5h and 5i to the power source 10.

On the upper surface of the main body 13 of the junction block JB, as shown in FIG. 4, there are formed a first male potentially redundant resistance connecting terminal 21 connected in common to one end of the potentially redundant resistance 4e and the corresponding voltage detector 5e, a second male potentially redundant resistance connecting terminal 22 connected in common to one ends of the respective potentially redundant resistances 4h, 4i and the corresponding voltage detectors 5h, 5i, two male intermediate connecting terminals 23, 24 connected in common to one end of the respective detector resistances other than the potentially redundant resistances 4e, 4h, 4i (hereinafter referred to as "non-redundant resistance") 4a–4d, 4f, and 4g and the corresponding voltage detectors 5a–5d, 5f, and 5g respectively and arranged adjacently in parallel with and spaced from two potentially redundant resistance connecting terminals 21, 22 as shown in FIG. 4, male load connecting terminals 25–33 connected respectively to the other ends of the detector resistances 4a–4i and connectable to the loads 1a, (1b), 2a–2d, 3a–3d respectively, a first male power source connecting terminal 34 connected in common to any of non-redundant resistances 4a–4d, the voltage detectors 5a–5d, and the first intermediate connecting terminal 23 and connectable to the power source 10 via the first switch 6 and the first fuse 8, and a second male power source connecting terminal 35 connected in common to other non-redundant resistances 4f, 4g, the voltage detectors 5f, 5g, and the second intermediate connecting terminal 24 and connectable to the power source 10 via the second switch 7 and the second fuse 9. As shown in FIG. 3, the potentially redundant resistance connecting terminals 21, 22 and the intermediate connecting terminals 23, 24 are arranged upright in the recess 41 formed on a part of the upper surface of the main body 13 of the junction block JB so as to constitute a first terminal group 42, the load connecting terminals 25–33 are arranged upright in the second recess 43 formed on another part of the upper surface of the main body 13 of the junction block JB so as to constitute the second terminal group 44, and the power source connecting terminals 34, 35 are arranged upright in the third recess 45 formed on still another part of the upper surface of the junction block together with other reserve terminals 36a–36h so as to constitute the third terminal group 46.

Figure 5:
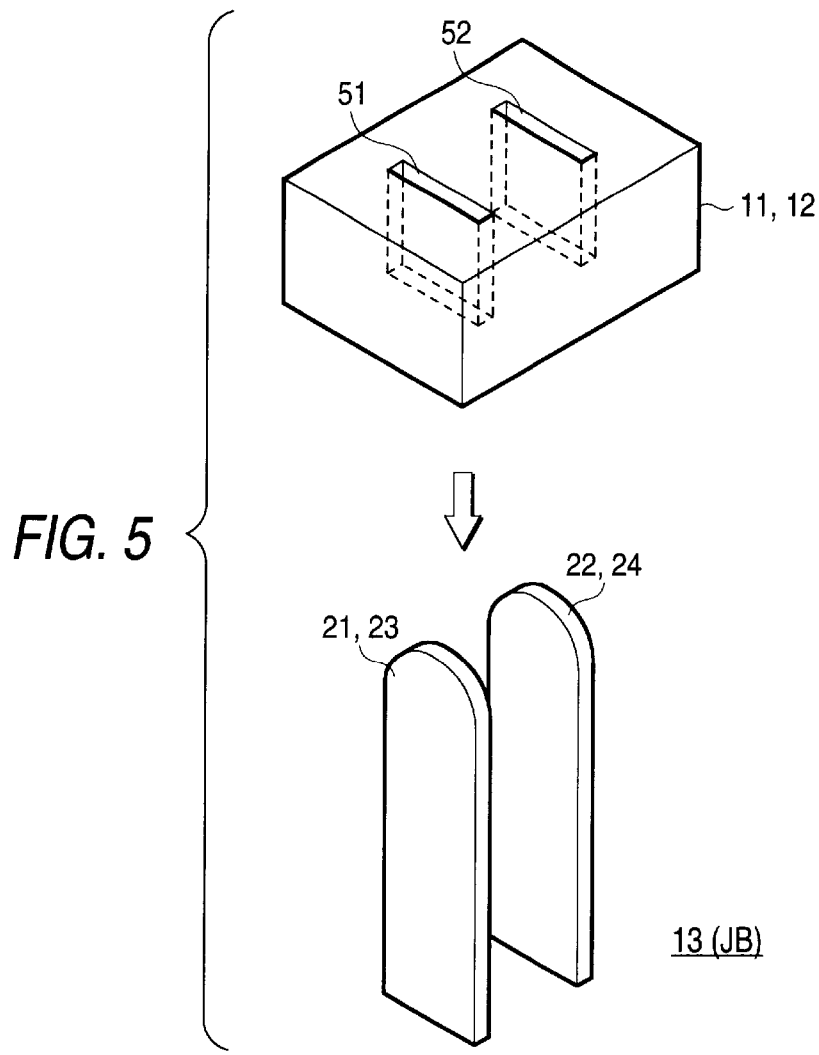
FIG. 5 is a perspective view showing an action in which the short-circuit member is being fitted to the terminal.
Figure 6:
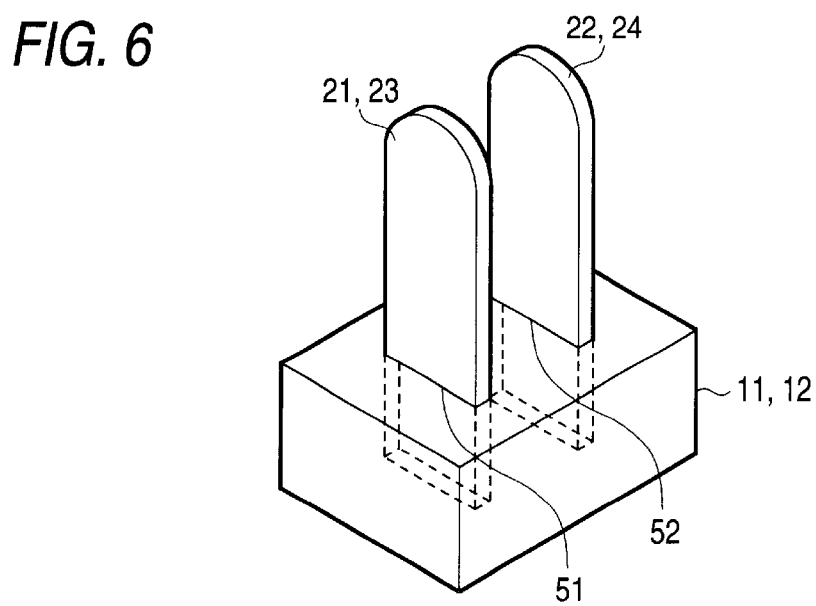
FIG. 6 is a perspective view showing a state in which the short-circuit member is fitted to the terminal.

The short-circuit member 11, 12 is, as shown in FIG. 5 and FIG. 6, a female electrically conductive member of a prescribed metal strip formed of an electric conductor such as copper in a rectangular shape provided with a pair of insertion connecting holes 51, 52 for inserting a first potentially redundant resistance connecting terminal 21 and the first intermediate connecting terminal 23, or the second potentially redundant resistance connecting terminal 22 and the second intermediate connecting terminal 24 for establishing electrical connections. The insertion connecting holes 51, 52 are formed vertically through the metal strip in parallel with respect to each other corresponding to the positions and the configurations of the potentially redundant resistance connecting terminals 21, 22 and intermediate connecting terminals 23, 24.

In FIGS. 1 and 2, the reference numerals and signs 1a, 1b designate high-mount stop lamps with power consumption of 18 watts, the reference numerals and signs 2a–2d designate stop lamps with power consumption of 21 watts, and the reference numerals and signs 3a–3d designate the tail lamps 3a–3d with power consumption of 5 watts respectively. The detector resistances 4a–4e and the corresponding voltage detectors 5a–5e are used for detecting a break in the high-mount stop lamps 1a, 1b and the stop lamps 2a–2d, and the detector resistances 4f–4i and the corresponding voltage detectors 5f–5i are used for detecting a break in the tail lamps 3a–3d.

The voltage detector circuit 5a–5i used are the same as ones shown in the related examples 1 and 2, and constructed in such a manner that the potential difference generated across each detector resistance 4a–4i is input as a voltage when each detector resistances 4a–4i is energized and a prescribed signal is determined by the external determination apparatus, not shown, with the voltage as a power source. More specifically, a low voltage output is produced by the use of the voltage drop at each detector resistance 4a–4i while each detector resistance 4a–4i is being energized, and high voltage output is produced to the external alarm apparatus or the like, not shown, by maintaining the voltage level of the power source 10 when each detector resistance 4a–4i is not energized.

<Operation>

How to use the junction block (vehicle-mounted electrical components) in the construction described above will now be described.

TABLE 2

| Pin | Vehicle A | Vehicle B | Vehicle C |
| --- | --- | --- | --- |
| 21–23 | Short-circuit | Open | Open |
| 22–24 | Short-circuit | Open | Short-circuit |

As shown in FIG. 1, in the case of an automotive vehicle having a high-mount stop lamp 1a, four stop lamps 2a–2d, and four tail lamps 3a–3d (Vehicle A in Table 2), a high-mount stop lamp 1a is connected to the first load connection terminal 25, a stop lamps 2a–2d are connected to the second to fifth load connecting terminals 26–29, and tail lamps 3a–3d are connected to the sixth to ninth load connection terminals 30–33 respectively, and the power source 10 is connected to the first power source connection terminal 34 via the first switch 6 and the first fuse 8, and the power source 10 is connected to the second power source connection terminal 35 via the second switch 7 and the second fuse 9.

As in the column "Vehicle A" of Table 2, by inserting the first potentially redundant resistance connecting terminal 21 and the first intermediate connecting terminal 23 into the insertion connecting holes 51, 52 of the first short-circuit member 11, the connecting terminals 21, 23 are electrically short-circuited with respect to each other via the first short-circuit member 11.

Therefore, the potentially redundant resistances 4e, 4h, 4i and the corresponding voltage detectors 5e, 5h, 5i are connected to the power source via the potentially redundant resistance connecting terminals 21, 22, the intermediate connecting terminals 23, 24, the power source connecting terminals 34, 35, the switches 6, 7, and the fuses 8, 9.

In this state, the power source is supplied to the junction block JB by closing the switches 6, 7 and a driving current is supplied to each load 1a, 2a–2d, 3a–3d via the junction block JB. Then, a break in the lamp is detected by detecting voltage drop at the detector resistances 4a–4i connected in series with the loads 1a, 2a–2d, 3a–3d respectively by means of the voltage detectors 5a–5i.

Specifically, when the loads 1a, 2a–2d, 3a–3d are not broken, the loads 1a, 2a–2d, 3a–3d are energized via the detector resistances 4a–4i of the junction bock JB, and a low voltage output is supplied from each voltage detector 5a–5i by the use of voltage drop at each detector resistance 4a–4i.

On the other hand, when any one of the loads 1a, 2a–2d, 3a–3d is broken, the corresponding detector resistance 4a–4i is not energized, and the voltage level at the node between that detector resistance 4a–4i and the broken load 1a, 2a-ed, 3a–3d can be maintained at the voltage level of the power source 10. Therefore, after the voltage detector 5a–5i detected a break in the load, a high voltage is output to the external alarm apparatus or the like, not shown, whereby the alarm apparatus makes an alarm, for example, to notify that any one or more of the loads 1a, 2a–2d, 3a–3d are broken.

In the junction block (vehicle-mounted electrical components), in the case of a vehicle having two high-mount stop lamps 1a, 1b and two stop lamps 2a, 2b, and two tail lamps 3a, 3b (Vehicle B in Table 2) as shown in FIG. 2, one of high-mount stop lamps 1a is connected to the first load connecting terminal 25, the stop lamps 2a, 2b are connected to the second and third load connecting terminals 26, 27, and the tail lamps 3a, 3b are connected to the sixth and seventh load connecting terminal 30, 31 respectively. The other high-mount stop lamp 1b is connected to the fourth load connecting terminal 28. No load is connected to the fifth, eighth, and ninth load connecting terminals 29, 32, 33. The power source 10 is connected to the first power source connecting terminal 34 via the first switch 6 and the first fuse 8, and the power source 10 is connected to the second power source connecting terminal 35 via the second switch 7 and the second fuse 9.

As shown in the column of "Vehicle B" in Table 2, the potentially redundant connecting terminals 21, 22 and the intermediate connecting terminals 23, 24 are not fitted with the short-circuit members 11, 12 and left opened.

Therefore, a voltage from the power source 10 is not supplied to the potentially redundant resistances 4e, 4h, 4i and the corresponding voltage detectors 53, 5h, 5i, whereby the state in which output from the voltage detecting circuits 5e, 5h, 5i is not supplied to the external alarm apparatus or the like at all is maintained.

In this state, the power is supplied to the junction block JB by closing the switches 6, 7, and a driving current is supplied to the loads 1a, 1b, 2a, 2b, 3a, 3b via the junction block JB. Then a break in the load 1a, 1b, 2a, 2b, 3a, 3b, if any, is detected by detecting voltage drop at the detector resistances 4a–4d, 4f, 4g connected in series to the loads 1a, 1b, 2a, 2b, 3a, 3b respectively by the voltage detectors 5a–5d. Specifically, when the respective loads 1a, 1b, 2a, 2b, 3a, 3b are not broken, a current is supplied to the respective loads 1a, 1b, 2a, 2b, 3a, 3b through the detector resistances 4a–4d, f, 4g of the junction block JB, and a low voltage output is produced at the voltage detectors 5a–5d, 5f, 5g by the use of voltage drop at the detector resistances 4a–4d, 4f, 4g. On the other hand, when any one of the loads 1a, 1b, 2a, 2b, 3a, 3b is broken, the corresponding detector resistance 4a–4d, 4f, 4g is not energized and thus the voltage level at the node between the detector resistance 4a–4d, 4f, 4g and the broken load 1a, 1b, 2a, 2b, 3a, 3b is maintained at the voltage level of the power source 10. Therefore, after the voltage detector 5a–5d, 5f, 5g detected it, a high voltage output is supplied to the external alarm apparatus or the like, not shown, whereby the alarm apparatus makes an alarm, for example, to notify that the any one or more of the loads 1a, 1b, 2a, 2b, 3a, 3b are broken.

Figure 16:
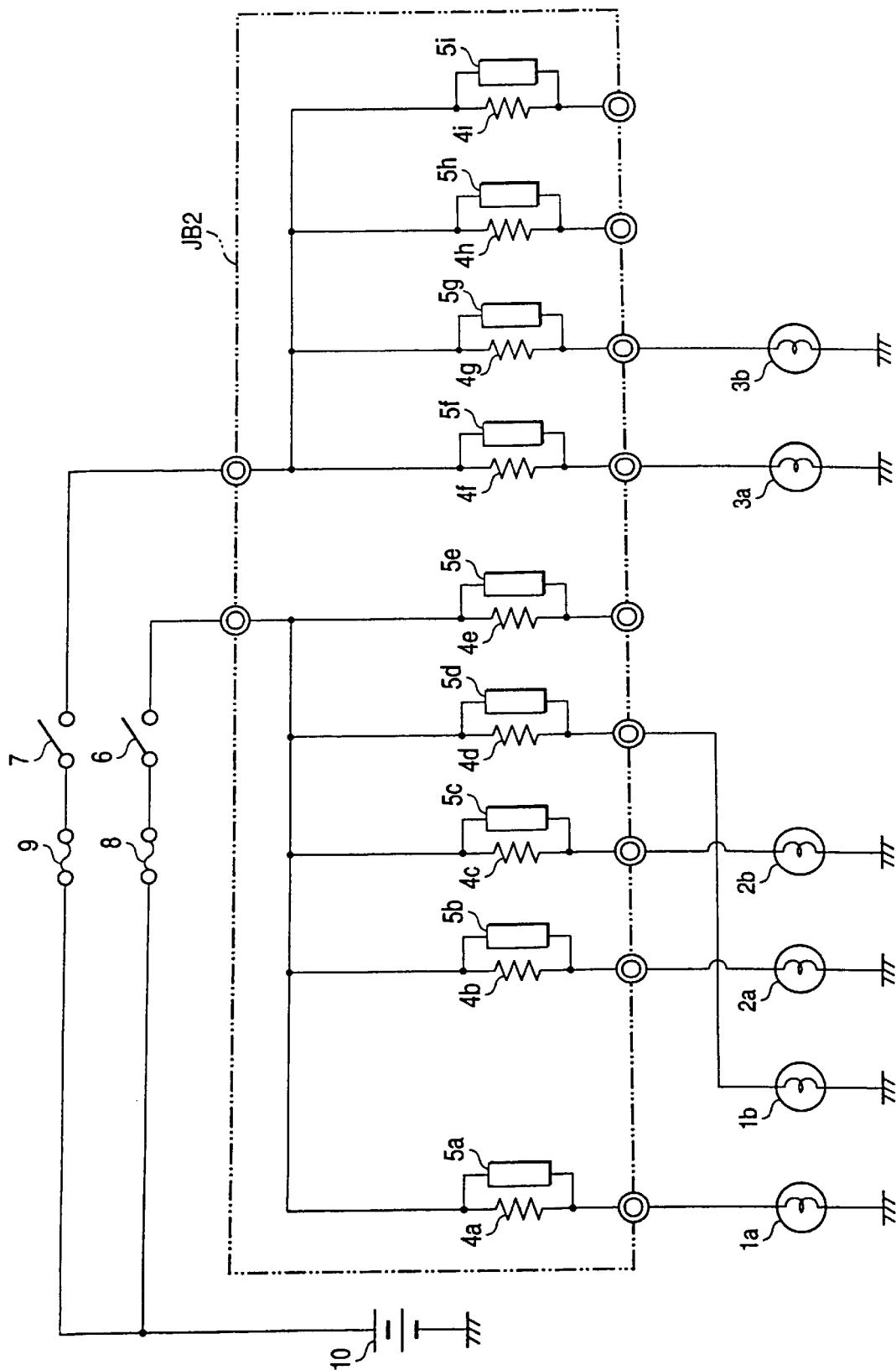
FIG. 16 is a block diagram showing the vehicle-mounted electrical component according to the related example 2.

As regards the potential redundant resistances 4e, 4h, and 4i and the corresponding voltage detectors 5e, 5h, and 5i to which the loads are not connected, a current from the power source 10 is not supplied because the short-circuit members 11, 12 are omitted, and thus no signal is transmitted to the external alarm apparatus. Therefore, as shown in the related example 2 shown in FIG. 16, a false detection of a break and an output thereof by the voltage detectors 5e, 5h, 5i due to the fact that no load is connected is prevented, and output of an alarm by a prescribed alarm apparatus (not shown) is also prevented. In other words, a single junction block JB can be used in common for various car models having different specifications and for specifications of the limited-edition car, and thus identification of the junction blocks by colors of the case or by bar codes, which is required when they are classified by product number, is not necessary. Therefore, administrative costs may be reduced since the product number control, mounting program in the manufacturing process, and the inspection items for the inspection program are required only for a single kind of junction block.

As for vehicles with other specifications (corresponds to another example in Table 1) as Vehicle C in Table 2, it is also possible to short circuit only between the terminals 21 and 23 by the first short-circuit member 11 and to open between the terminals 22 and 24. In this case, two high-mount stop lamps 1a, 1b and two stop lamps 2a, 2b are connected as shown in FIG. 2 and four tail lamps 3a–3d are connected to the load connecting terminals 30–33 respectively.

As shown in FIG. 3 and FIG. 4, since the terminals 21–24 (first terminal group 42) for detachably connecting the short-circuit members 11, 12 is provided upright in the first recess 41 of the upper surface of the main body 13 of the junction block JB, the short-circuit members 11, 12 can be attached to or detached from the terminals 21–24 (first terminal group 42) in the first recess 41 from outside of the junction block JB according to the arrangement of the loads, and thus the vehicle-mounted electrical components (a junction block JB) with high operability and compatibility may be provided.

In this embodiment, though the terminals 21–24 are formed as male terminals and the short-circuit members 11, 12 are formed as male conductive member, so that they can be fitted together, it is also possible, as a matter of course, to form the terminals 21–24 as female type terminals and the short-circuit members 11, 12 as male conductive members so that they can be fitted together.

(Second Embodiment)
<Structure>

Figure 7:
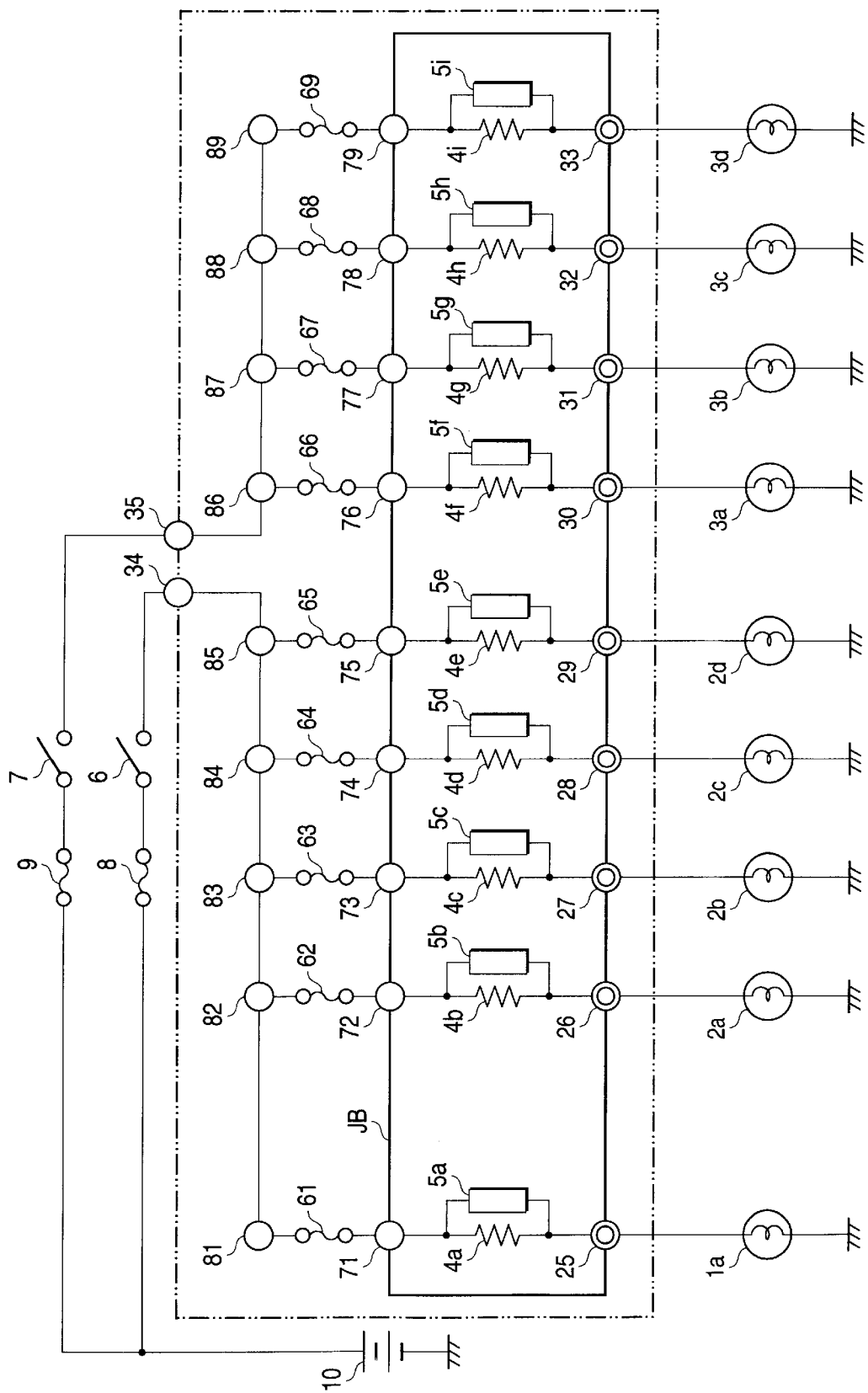
FIG. 7 is a block diagram of the vehicle-mounted electrical component according to the second embodiment of the invention showing a state of being applied to the car in accordance with the first specifications.
Figure 8:
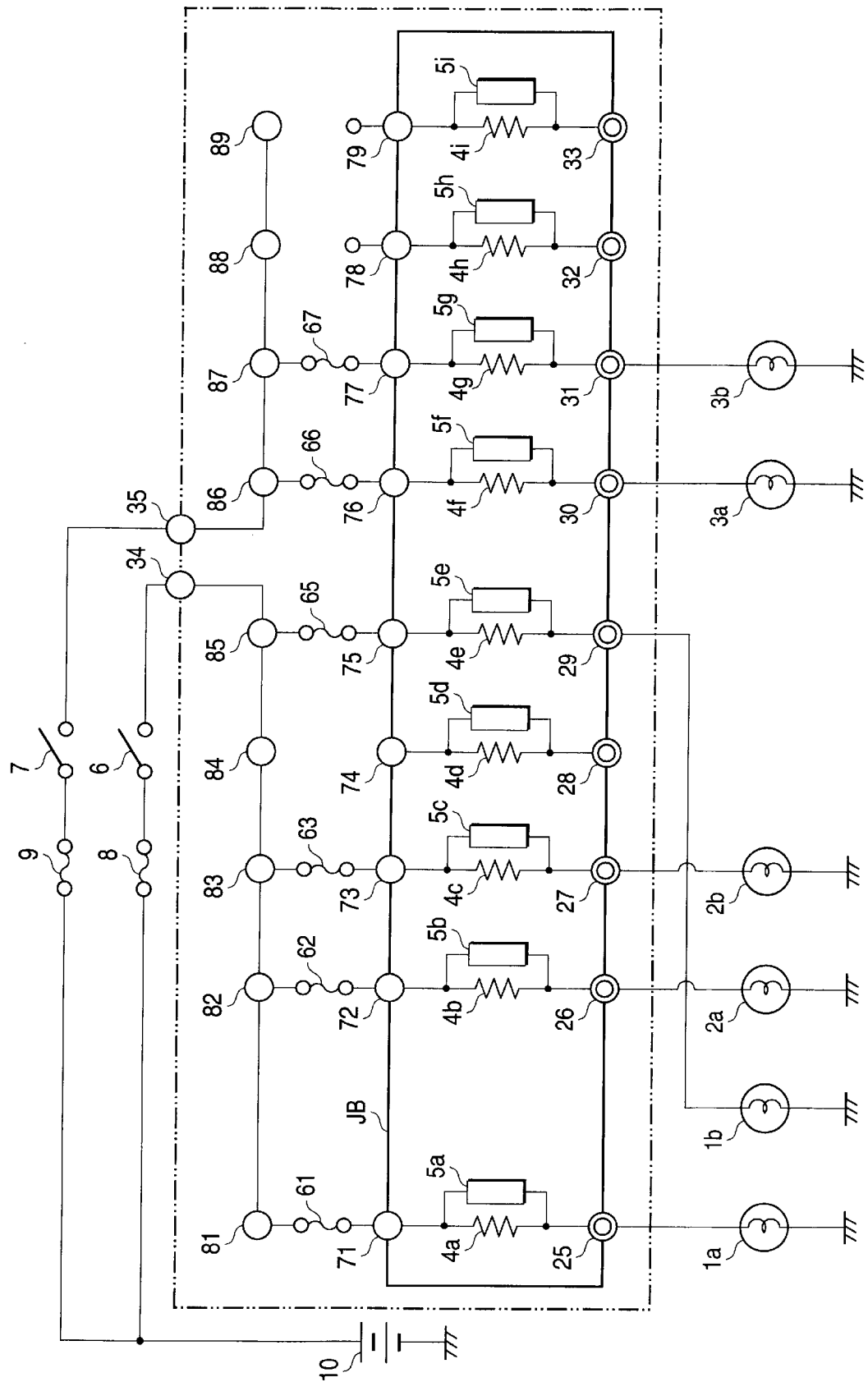
FIG. 8 is a block diagram of the vehicle-mounted electrical component according to the second embodiment of the invention showing a state of being applied to the car in accordance with the second specifications.
Figure 9:
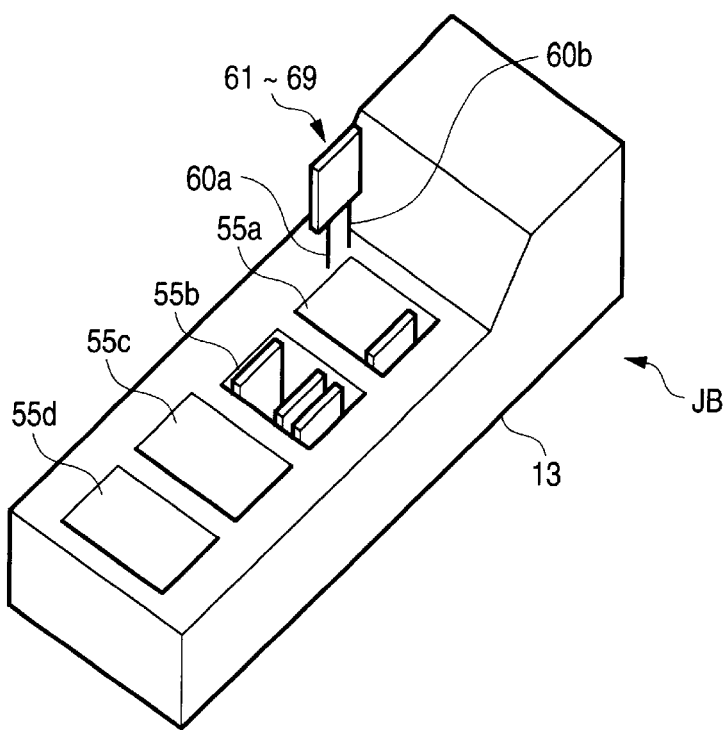
FIG. 9 is a perspective view of the vehicle-mounted electrical component according to the second embodiment of the invention.
Figure 10:
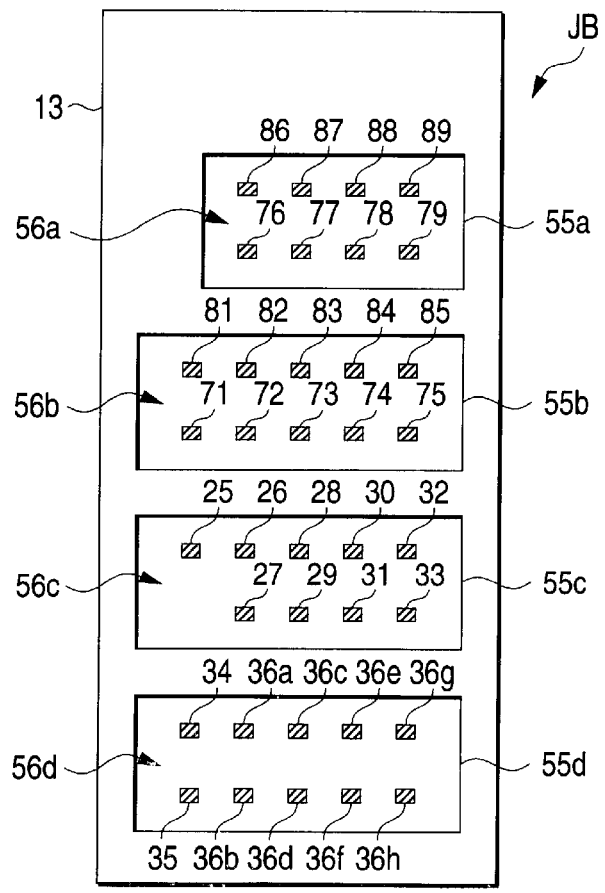
FIG. 10 is a plan view of the vehicle-mounted electrical component according to the second embodiment of the invention.

FIG. 7 is a block diagram of a circuit showing a first state in which the junction block JB as a vehicle-mounted component according to the second embodiment of the invention is connected to a plurality of loads 1a, 2a–2d, 3a–3d such as a vehicle-mounted lamp or the like, FIG. 8 is a block diagram of the circuit in a second state in which the junction block JB is connected to a plurality of loads 1a, 1b, 2a, 2b, 3a, 3b, FIG. 9 is a perspective view of the junction block JB, and FIG. 10 is a plan view of the same. Identical reference numerals and signs designate identical components having the same functions as the first embodiment from FIG. 7 through FIG. 10.

The vehicle-mounted electrical component of this embodiment is constructed in such a manner that, as shown in FIG. 7, the fuses 61–69 being interposed between the vehicle-mounted electrical component and the power source 10 are detachably connectable at the nodes between the detector resistances 4a–4i and the voltage detectors 5a–5i. When each fuse 61–69 is connected, a driving current supplied from the power source 10 through the fuse 8, 9 and switch 6, 7 is supplied to each detector resistance 4a–4i via each fuse 61–69. On the other hand, when any one of the fuses 61–69 is removed, a driving current supplied from the power source 10 via the fuses 8, 9 and the switches 6, 7 is prevented from being supplied to the detector resistance 4a–4i and the voltage detector 5a–5i corresponding to the removed fuse 61–69.

These fuses 61–69 are constructed in such a manner that two pins 60a, 60b projecting downwardly from the lower ends of the fuses 61–69 are inserted into the female terminals 71–89 formed in the recesses 55a, 55b on the upper surface of the main body 13 of the junction block JB from the outside so that the detector resistances 4a–4i and the voltage detectors 5a–5i in the junction block JB shown in FIG. 7 and FIG. 8 are connected to the power source 10.

The terminals 71–79 are connected to the nodes of the detector resistances 4a–4i and the voltage detectors 5a–5i on the side of the power source 10. The terminals 81–89 are connected in common to the first power source connecting terminal 34, and the terminals 86–89 are connected in common to the second power source connecting terminal 35.

As shown in FIG. 10, the terminal 71 and the terminal 81 are connected via the fuse 61 by placing those terminals adjacently in parallel with respect to each other and inserting both pins 60a, 60b of a single fuse 61 simultaneously into those terminals. Likewise, the terminals 72 and 82 are connected via the fuse 62 by placing those terminals 72 and 82 adjacently in parallel with respect to each other and inserting both pins 60a, 60b of a single fuse 62 simultaneously into those terminals. Again, the terminals 73–79 and the terminals 83–89 are connected respectively via the respective fuses 63–69 by placing the those terminals 73–79 and 83–89 adjacently with in parallel with respect to each other and inserting both pins 60a and 60b of the respective fuses 63–69 simultaneously in to those terminals.

The reference numerals and signs 55a–55d in FIGS. 9 and 10 designate the recesses, and the reference numerals 56a–56d designate the terminal group respectively.

Since other constructions are the same as the first embodiment, the description will be omitted.

<Operation>

The operation of the vehicle-mounted electrical component having a structure described above will now be described.

TABLE 3

| Fuse | Vehicle A | Vehicle B | Vehicle C |
|---|---|---|---|
| 64 | Present | Not prevent | Not present |
| 68 | Present | Not present | Present |
| 69 | Present | Not present | Present |

As shown in FIG. 7, in the case of an automotive vehicle having one high-mount stop lamp 1a, four stop lamps 2a–2d, and four tail lamps 3a–3d (Vehicle A in Table 3), the high-mount stop lamp 1a is connected to the first load connecting terminal 25, the stop lamps 2a–2d are connected to the second to fifth load connecting terminals 26–29, and the tail lamps 3a–3d are connected to the sixth to ninth load connecting terminals 30–33 respectively, the power source 10 is connected to the first power source connecting terminal 34 via the first switch 6 and the first fuse 8, and the power source 10 is connected to the second power source connecting terminal 35 via the second switch 7 and the second fuse 9.

Since all the detector resistances 4a–4i and the voltage detectors 5a–5i have the loads 1a, 2a–2d, 3a–3d connected thereto, the fuses 61–69 are connected to all the terminals 71–89 from the outside as shown in FIG. 9. Especially, the fuses 64, 68, 69 are fitted to the terminals 74, 84, the terminals 78, 88, and the terminals 79, 89 as shown in the column of "Vehicle A" in Table 3, and the adjacent pairs of terminals 74 and 84, 78 and 88, 79 and 89 are electrically shorted.

Accordingly, the potential redundant resistances 4d, 4h, 4i and the corresponding voltage detectors 5d, 5h, 5i are connected to the power source 10 via the terminals (potential redundant resistance connecting terminals) 74, 78, 79, the fuses 64, 68, 69, the terminals (intermediate connecting terminals) 84, 88, 89, the power source connecting terminals 34, 35, the switches 6, 7, and the fuses 8, 9.

In this state, the power source is supplied to the junction block JB by closing the switches 6, 7 and a driving current is supplied to each load 1a, 2a–2d, 3a–3d via the junction block JB. Then, a break in the lamp is detected by detecting voltage drop at the detector resistances 4a–4i connected respectively in series to the loads 1a, 2a–2d, 3a–3d by means of the voltage detectors 5a–5i.

In the junction block (vehicle-mounted electrical components) JB, in the case of a vehicle having two high-mount stop lamps 1a, 1b and two stop lamps 2a, 2b, and two tail lamps 3a, 3b (Vehicle B in Table 3) as shown in FIG. 8, one of high-mount stop lamps 1a is connected to the first load connecting terminal 25, the stop lamps 2a, 2b are connected to the second and third load connecting terminals 26, 27, and the tail lamps 3a, 3b are connected to the sixth and seventh load connecting terminals 30, 31 respectively. The other high-mount stop lamp 1b is connected to the fifth load connecting terminal 29. No load is connected to the fourth, eighth, and ninth load connecting terminals 28, 32, 33. The power source 10 is connected to the first power source connecting terminal 34 via the first switch 6 and the first fuse 8, and the power source 10 is connected to the second power source connecting terminal 35 via the second switch 7 and the second fuse 9.

Then the fuses 61–63, 65–67 are connected to the terminals 71–73, 75–77, 81–83, 85–87 respectively. At this time, the terminals 74, 84, the terminals 78, 88, and the terminals 79, 89 are not fitted with the fuse as the column of "Vehicle B" in Table 3.

Therefore, the potentially redundant resistances 4d, 4h, 4i and the corresponding voltage detectors 5d, 5h, 5i are not supplied with a current from the power source 10 and no signal output is supplied to the exterior alarm apparatus or the like because the fuses 64, 68, 69 are omitted. Therefore, it is prevented that each voltage detector 5d, 5h, 5i detects a break of the lamp in error resulting from no load being connected, produces an output to notify the occurrence of said break, and thus makes an alarm by the prescribed alarm apparatus (not shown) as in the case of the related example 2 shown in FIG. 16.

As regards the automotive vehicles of other specifications as the Vehicle C in Table 3 for example, it is also possible to connect fuses 68, 69 between the terminals 78, 88 and the terminals 79, 89 respectively so as to cause a short-circuit therebetween, and to open between the terminals 74 and 84.

As in FIGS. 9 and 10, since the terminals 71–89 are formed in the recesses 55a, 55b on the upper surface of the main body 13 of the junction block JB so that the fuses 61–69 are detachably connected thereto, the fuses 61–69 can be connected from the outside of the junction block JB according to the arrangement of the loads, and thus a vehicle-mounted electrical components (junction block JB) with high operability and compatibility may be provided.

Instead of the fuses 61–69 in FIG. 7, the short-circuit member as shown in the first embodiment may be used as a matter of course to obtain the same effect.

(Third Embodiment)
<Structure>

Figure 11:
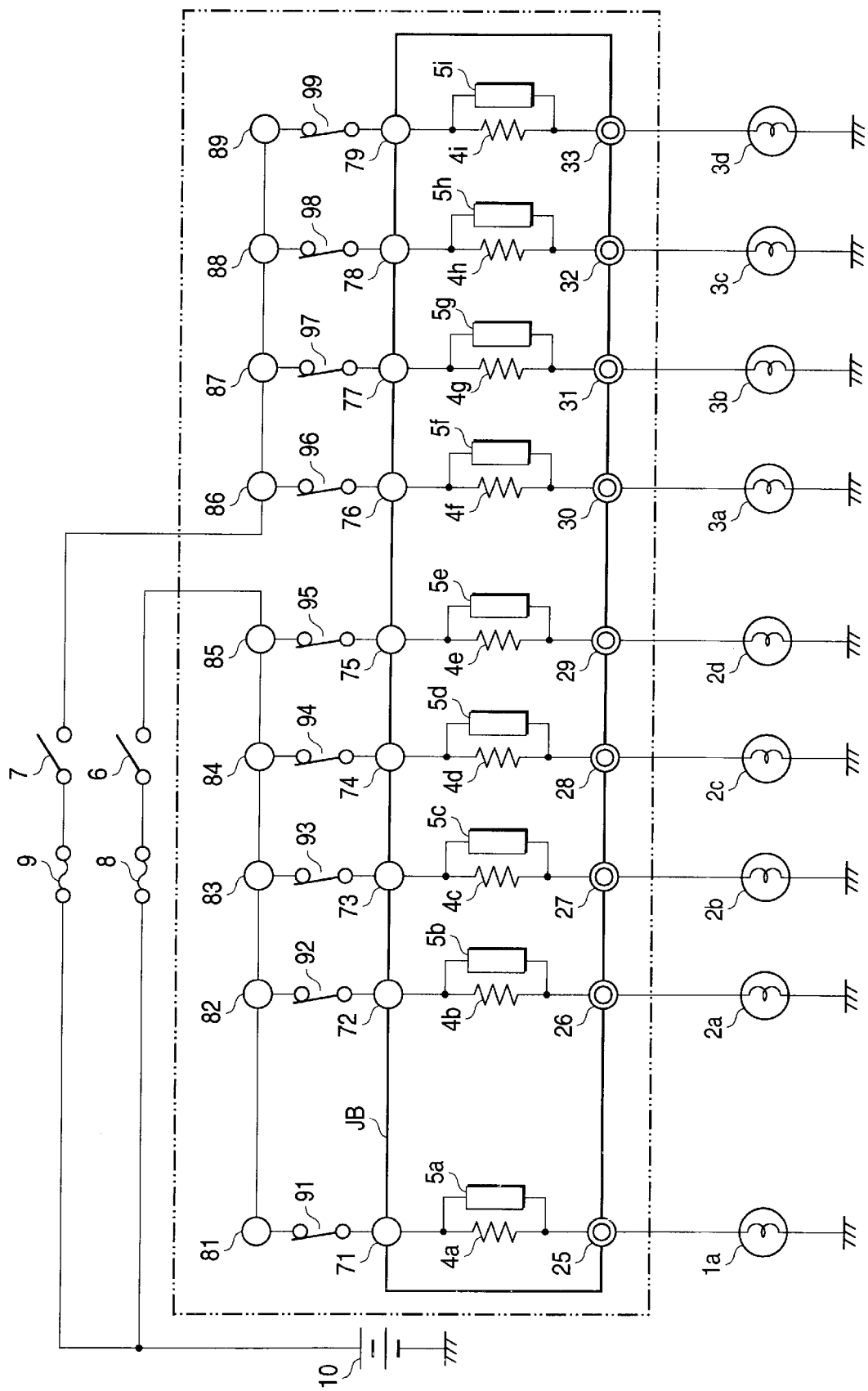
FIG. 11 is a block diagram of the vehicle-mounted electrical component according to the third embodiment of the invention showing a state of being applied to the car in accordance with the first specifications.
Figure 12:
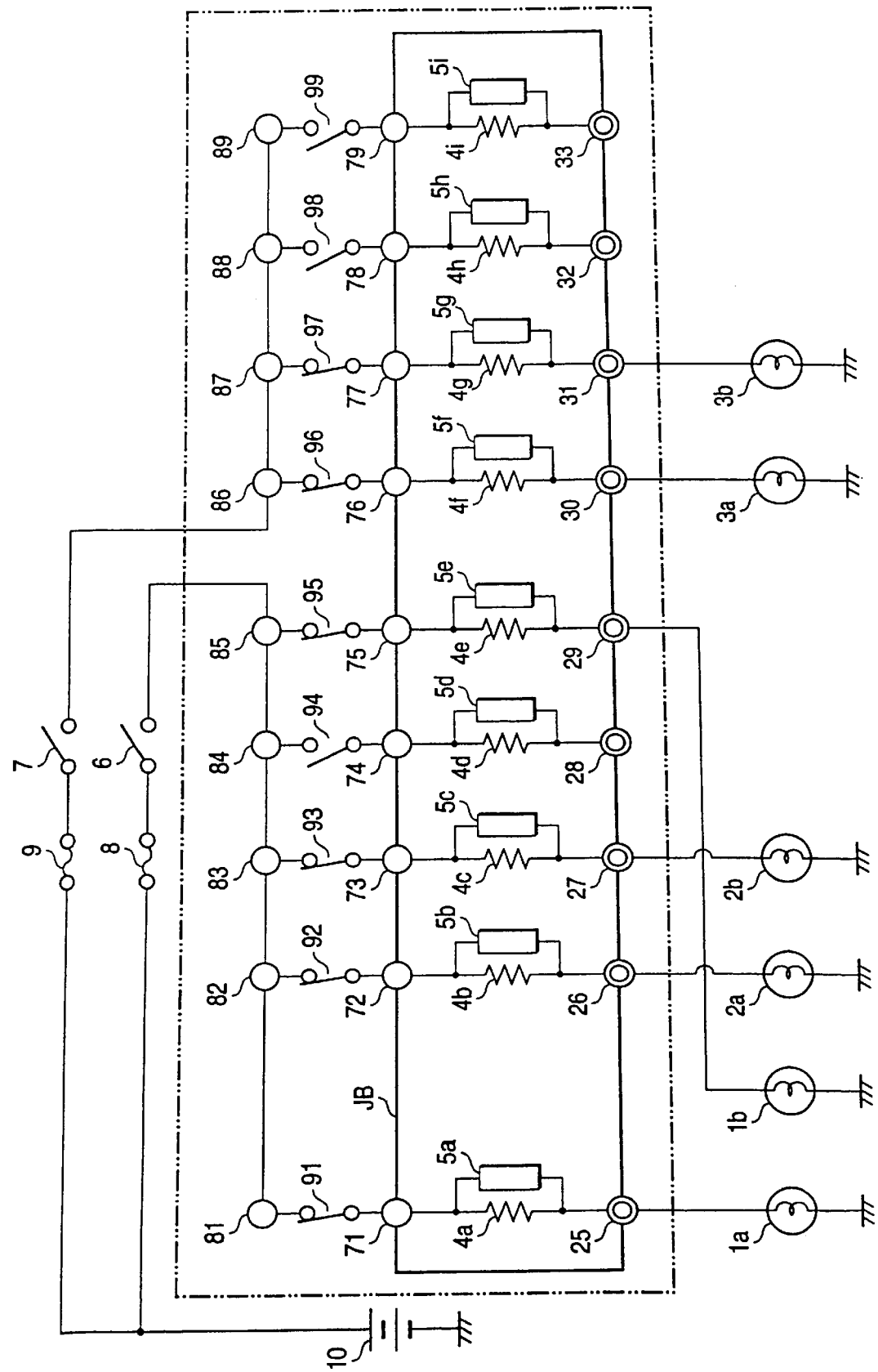
FIG. 12 is a block diagram of the vehicle-mounted electrical component according to the third embodiment of the invention showing a state of being applied to the car in accordance with the second specifications.
Figure 13:
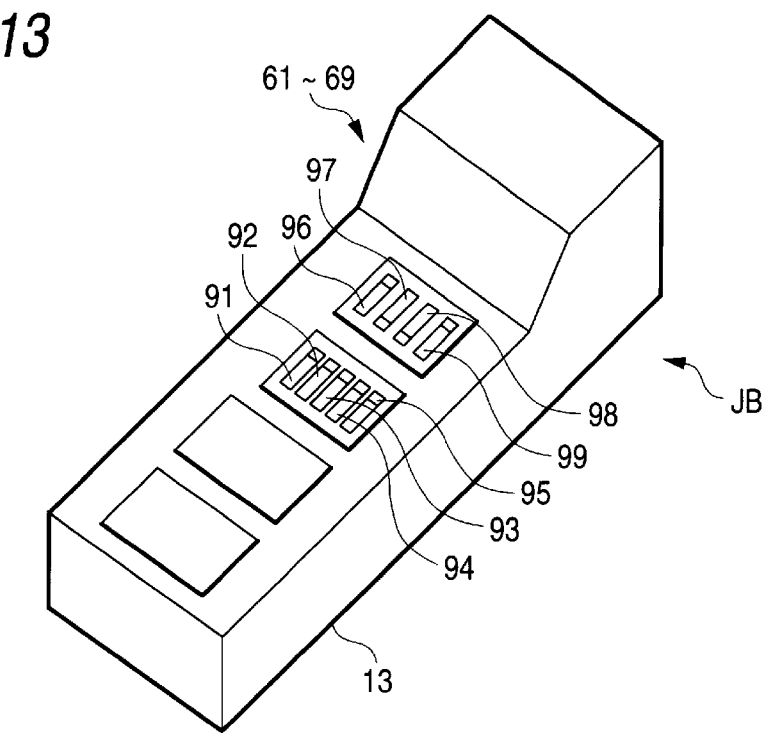
FIG. 13 is a perspective view of the vehicle-mounted electrical component according to the third embodiment of the invention.
Figure 14:
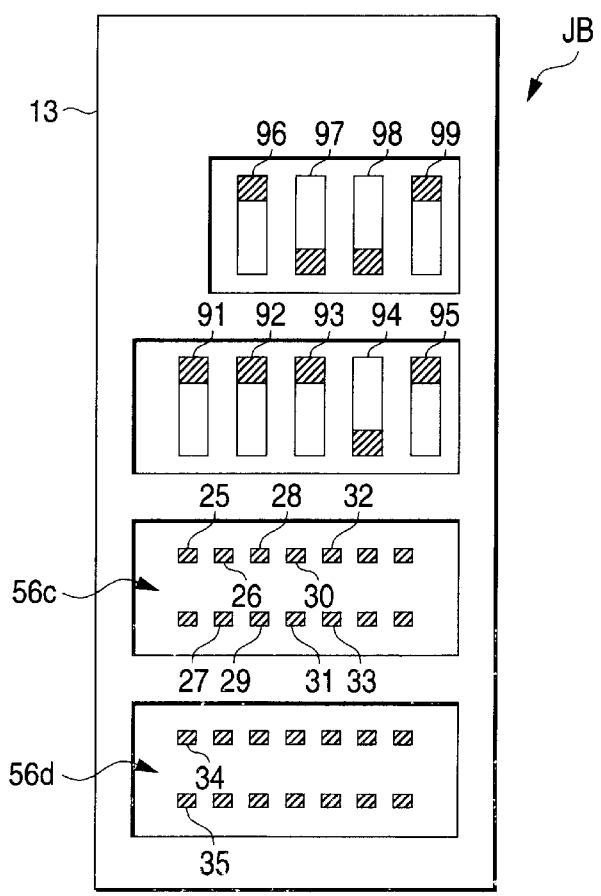
FIG. 14 is a plan view of the vehicle-mounted electrical component according to the third embodiment of the invention.
Figure 15:
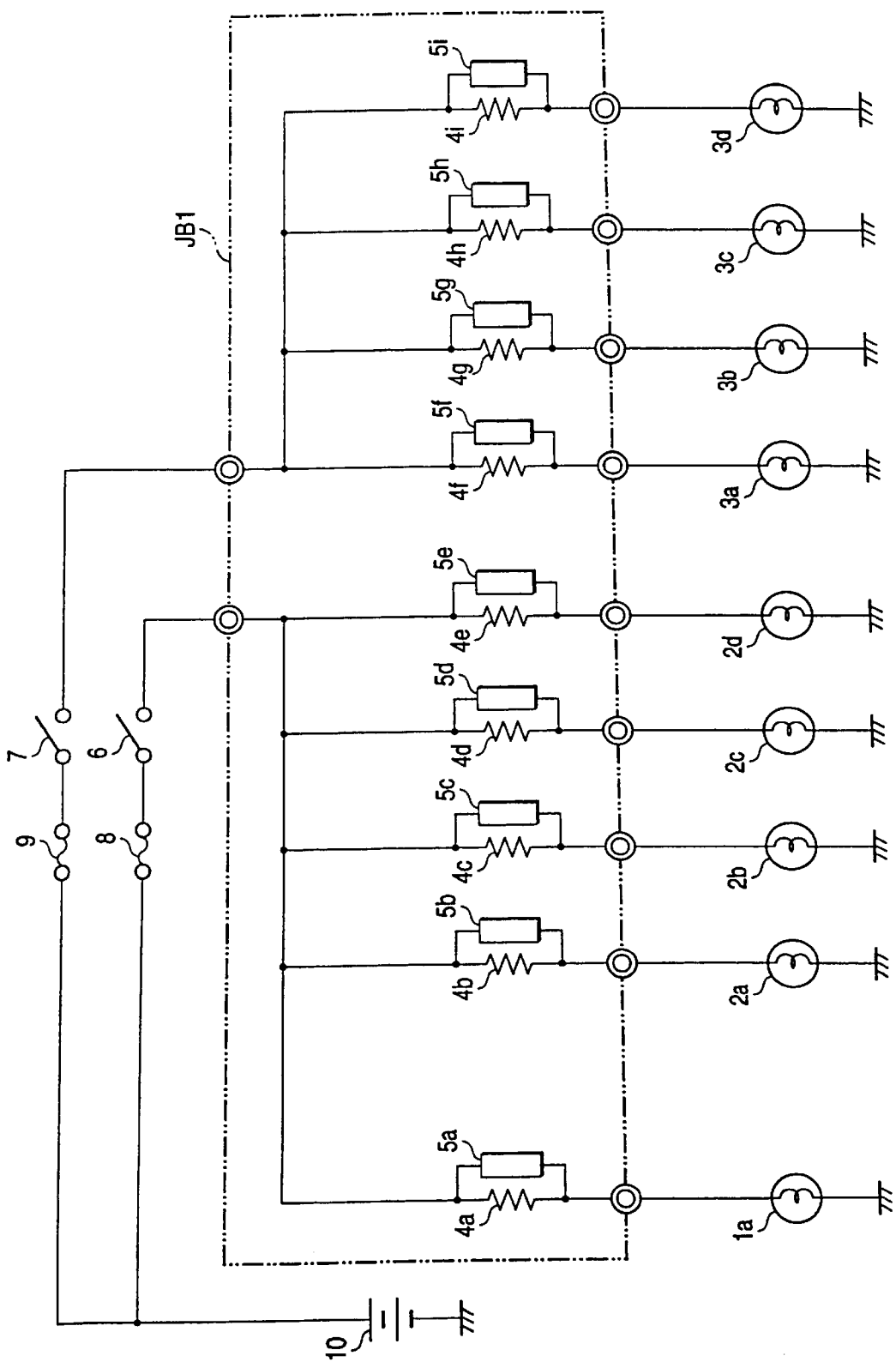
FIG. 15 is a block diagram showing the vehicle-mounted electrical component according to the related example 1.

FIG. 11 is a block diagram of the circuit showing a first state in which a junction block JB as a vehicle-mounted electrical component according to the third embodiment of the invention is connected to a plurality of loads 1a, 2a–2d, 3a–3d such as the vehicle-mounted lamp or the like, FIG. 12 is a block diagram of the circuit showing a second state in which a junction block JB is connected to a plurality of loads 1a, 1b, 2a, 2b, 3a, 3b, FIG. 13 is a perspective view of the junction block JB, and FIG. 14 is a plan view thereof. Identical reference numbers and signs designate components having the same functions as in the second embodiment from FIGS. 11 to 14.

In the vehicle-mounted electrical component of this embodiment, as shown in FIG. 11, individual slidable switches 91–99 is interposed between the vehicle-mounted electrical component and the power source 10 at the nodes between the respective detector resistances 4a–4i and the respective voltage detectors 5a–5i so as to be opened and closed freely. When each switch 91–99 is closed (turned on), a driving current supplied from the power source 10 through the fuse 8, 9 and the switch 6, 7 is supplied to each detector resistance 4a–4i and each voltage detector 5a–5i via each switch 91–99. On the other hand, when any one of the switches 91–99 is opened (turned off), a driving current supplied from the power source 10 via the fuse 8, 9 and the switch 6, 7 is prevented from being supplied to the detector resistances 4a–4i and the voltage detectors 5a–5i corresponding to the opened switches 91–99.

These switches 91–99 are interposed between the terminals 71–79 on the side of the detector resistances 4a–4i and the voltage detectors 5a–5i and the terminals 81–89 on the side of the power source 10 respectively.

As shown in FIGS. 13 and 14, the switches 91–99 are mounted on the upper surface of the main body 13 of the junction block JB, and can be switched between opened state and closed state (ON-OFF switching) respectively from the outside of the junction block JB.

Since other structures are the same as the second embodiment, the description will be omitted.
<Operation>

The operation of the vehicle-mounted electrical component having a structure as described above will now be described.

TABLE 4

| Switch | Vehicle A | Vehicle B | Vehicle C |
|---|---|---|---|
| 94 | On | Off | Off |
| 98 | On | Off | On |
| 99 | On | Off | On |

As shown in FIG. 11, in the case of an automotive vehicle having one high-mount stop lamp 1a, four stop lamps 2a–2d, and four tail lamps 3a–3d (Vehicle A in Table 3), the high-mount stop lamp 1a is connected to the first load connecting terminal 25, the stop lamps 2a–2d are connected to the second to fifth load connecting terminals 26–29, and the tail lamps 3a–3d are connected to the sixth to ninth load connecting terminals 30–33 respectively, the power source 10 is connected to the first power source connecting terminal 34 via the first switch 6 and the first fuse 8, and the power source 10 is connected to the second power source connecting terminal 35 via the second switch 7 and the second fuse 9.

Since all the detector resistances 4a–4i and the voltage detectors 5a–5i have the loads 1a, 2a–2d, 3a–3d connected thereto, all the switches 91–99 connected to the terminals 71–89 are switched to the closed state (ON-state) from the outside as shown in FIG. 11. Especially, the switches 94, 98, 99 interposed respectively between the terminals 74 and 84, the terminals 78 and 88, and the terminals 79 and 89 are also switched into the closed-state respectively as the Vehicle A in Table 4 as in the case of the switches 91–93 and 95–97.

Accordingly, the potentially redundant resistances 4d, 4h, 4i and the corresponding voltage detecting circuit 5d, 5h, 5i are connected to the power source 10 via the terminals (potentially redundant resistance connecting terminals) 74, 78, 79, the switches 94, 98, 99, the terminals (intermediate connecting terminals) 84, 88, 89, the power source connecting terminals 34, 35, the switches 6, 7 and the fuses 8, 9.

In this state, the power source is supplied to the junction block JB by closing the switches 6, 7 and a driving current is supplied to each load 1a, 2a–2d, 3a–3d via the junction block JB. Then, a break in the lamp is detected by detecting voltage drop at the detector resistances 4a–4i connected respectively in series with each loads 1a, 2a–2d, 3a–3d by means of the voltage detectors 5a–5i.

In the junction block (vehicle-mounted electrical components) JB, in the case of a vehicle having two high-mount stop lamps 1a, 1b and two stop lamps 2a, 2b, and two tail lamps 3a, 3b (Vehicle B in Table 4) as shown in FIG. 8, one of high-mount stop lamps 1a is connected to the first load connecting terminal 25, the stop lamps 2a, 2b are connected to the second and third load connecting terminals 26, 27, and the tail lamps 3a, 3b are connected to the sixth and seventh load connecting terminal 30, 31 respectively. The other high-mount stop lamp 1b is connected to the fifth load connecting terminal 29. No load is connected to the fourth, eighth, and ninth load connecting terminals 28, 32, 33. The power source 10 is connected to the first power source connecting terminal 34 via the first switch 6 and the first fuse 8, and the power source 10 is connected to the second power source connecting terminal 35 via the second switch 7 and the second fuse 9.

Then only the switches 91–93, 95–97 are switched into the closed state (ON-state). In this case, the switches 94, 98, and 99 are left opened (OFF-state) as the column of "Vehicle B" in Table 4.

Therefore, as regards the potentially redundant resistances 4d, 4h, 4i and the corresponding voltage detectors 5d, 5h, 5i, a current from the power source 10 is not supplied and no signal is output to the exterior alarm apparatus or the like because the switches 94, 98, 99 are in the OFF-state. Therefore, it is prevented that each voltage detector 5d, 5h, 5i detects a break of the lamp in error resulting from no load being connected, produces an output to notify the occurrence of said break, and thus makes an alarm by the prescribed alarm apparatus (not shown) as in the case of the related example 2 shown in FIG. 16.

As regards the automotive vehicles of other specifications as the Vehicle C in Table 4 for example, it is also possible to turn the switches 98, 99 in ON-state so as to cause a short-circuit between the terminals 78 and 88, and the terminals 79 and 89, and to turn the switch 94 OFF.

As in FIGS. 13 and 14, since the switches 91–99 are mounted on the upper surface of the main body 13 of the junction block JB so as to be able to switch ON and OFF from the outside, a vehicle-mounted electrical components (junction block JB) with high operability and compatibility may be provided.

Instead of the short-circuit member 11, 12 in FIG. 1 as described in conjunction with the first embodiment, the switch as shown in the third embodiment may be used as a matter of course to obtain the same effect.

According to the invention according to the first to fourth aspects, as regards the potentially redundant resistance and the switching of short-circuit/disconnection between the respective potentially redundant resistance connecting terminals and the intermediate connecting terminals may be easily performed by attaching/detaching the short-circuit member as stated in conjunction with the second aspect or the fuse as stated in conjunction with the third aspect to/from the potentially redundant connecting terminals and the intermediate connecting terminals on the external surface of the main body or by opening/closing the switch as stated in conjunction with the fourth aspect. As a consequent, when no load is connected to the potentially redundant resistance and the intermediate connecting terminal, preventing supply of a current from the power source to the voltage detector by disconnecting between the potentially redundant resistance terminal and the intermediate connecting terminal respectively may prohibit all the signals from being supplied from the voltage detector to the exterior alarm apparatus or the like, and thereby preventing the voltage detector from detecting a break in the load in error and producing an output to notify that a break is occurred. Therefore, in other words, a single vehicle-mounted electrical component can be shared for various car models having different specifications or specifications for the limited-edition car, whereby administrative costs may be reduced since the product number control, mounting program in the manufacturing process, and the inspection items for the inspection program are required only for a single kind of junction block.

In addition, since the switching of short-circuit/disconnection of the connecting member such as the short-circuit member, the fuse, or the switch may be performed outside the main body, a vehicle-mounted electrical component with high operability and compatibility may be provided.

What is claimed is:

1. A vehicle-mounted electrical component to be connected between a prescribed power source and a plurality of loads, said vehicle-mounted electrical component comprising:

a main body of the vehicle-mounted electrical component;

a plurality of detector resistances positioned within said body and each resistance connected between each individual load and said power source;

a plurality of voltage detectors positioned within said body for detecting a break in said individual load by detecting a voltage drop at each individual detector resistance;

a potentially redundant resistance connecting terminal, to be connected at least to said detector resistance and said voltage detector, that is a redundant resistance connecting terminal when none of said plurality of loads is mounted thereto out of said detector resistances and said voltage detectors and that is a non-redundant resistance connecting terminal when the number of said plurality of loads corresponds to the number of said plurality of detector resistances or said plurality of voltage detectors; and an intermediate connecting terminal connected to a power source connecting terminal to be connected to said power source, and each terminal of said intermediate connecting terminal is associated with each terminal of said potentially redundant resistance connecting terminal, wherein said potentially redundant resistance connecting terminal and said intermediate connecting terminal are formed in parallel with respect to each other, are exposed on the external surface of the main body of said vehicle-mounted electrical component, can be short-circuited with respect to each other by a prescribed external connecting member when said potentially redundant resistance connecting terminal is said non-redundant resistance connecting terminal, and can be disconnected with respect to each other by removing or disconnecting said connecting member when said potentially redundant resistance connecting terminal is said redundant resistance connecting terminal so that a driving current supplied from said power source is prevented from being supplied to said detector resistance.

2. A vehicle-mounted electrical component as set forth in claim 1, wherein said connecting member is an electrically conductive short-circuit member detachably connectable to said potential redundancy resistance connecting terminal and to said intermediate connecting terminal on the external surface of said main body.

3. A vehicle-mounted electrical component as set forth in claim 1, wherein said connecting member is a fuse detachably connectable to said potential redundancy resistance connecting terminal and to said intermediate connecting terminal on the external surface of said main body.

4. A vehicle-mounted electrical component asset forth in claim 1, wherein said connecting member is a switch for switching between ON and OFF, and mounted between said potentially redundant resistance connecting terminal and said intermediate connecting terminal.

* * * * *